(12) United States Patent
Montanana

(10) Patent No.: US 6,260,685 B1
(45) Date of Patent: Jul. 17, 2001

(54) ROTARY COUPLINGS

(75) Inventor: Raul Montanana, Lydbrook (GB)

(73) Assignee: Samar Systems Limited, Gloucestershire (GB)

( * ) Notice: Subject to any disclaimer, the term of this patent is extended or adjusted under 35 U.S.C. 154(b) by 0 days.

(21) Appl. No.: 09/434,133

(22) Filed: Nov. 5, 1999

(30) Foreign Application Priority Data

Nov. 6, 1998 (GB) ........................................ 9824249

(51) Int. Cl.$^7$ ............................................ F16D 67/00
(52) U.S. Cl. ........................... 192/223.2; 192/12 B
(58) Field of Search .................. 192/12 B, 223.2, 192/223.1; 464/35, 37

(56) References Cited

U.S. PATENT DOCUMENTS

| | | | | |
|---|---|---|---|---|
| 1,883,087 | * | 10/1932 | Swartz | 192/223.2 |
| 2,052,094 | | 8/1936 | Huff . | |
| 3,022,680 | * | 2/1962 | Van Roojen | 192/12 B X |
| 4,706,791 | | 11/1987 | Magliano . | |
| 6,068,097 | * | 5/2000 | Kurita | 192/223.2 X |

FOREIGN PATENT DOCUMENTS

| | | |
|---|---|---|
| 0 751 032 | 1/1997 | (EP) . |
| 839 049 | 3/1939 | (FR) . |
| 936 954 | 9/1963 | (GB) . |
| 984 225 | 2/1965 | (GB) . |
| 1 042 013 | 9/1965 | (GB) . |
| 1 571 396 | 7/1980 | (GB) . |

* cited by examiner

Primary Examiner—Lynne H. Browne
Assistant Examiner—Greg Binda
(74) Attorney, Agent, or Firm—Young & Thompson

(57) ABSTRACT

A rotary coupling transmits normal driving torque from an input shaft to a rotary output member via a planet carrier ring which carries planetary coupling rollers. Radially inwards of the carrier ring, the rollers are in driving engagement with an output sleeve coupled to the output member. Reverse torque applied to the output member causes the rollers to tilt into wedging engagement against a fixed annular braking surface, thereby preventing the reverse torque from passing to the input side.

10 Claims, 1 Drawing Sheet

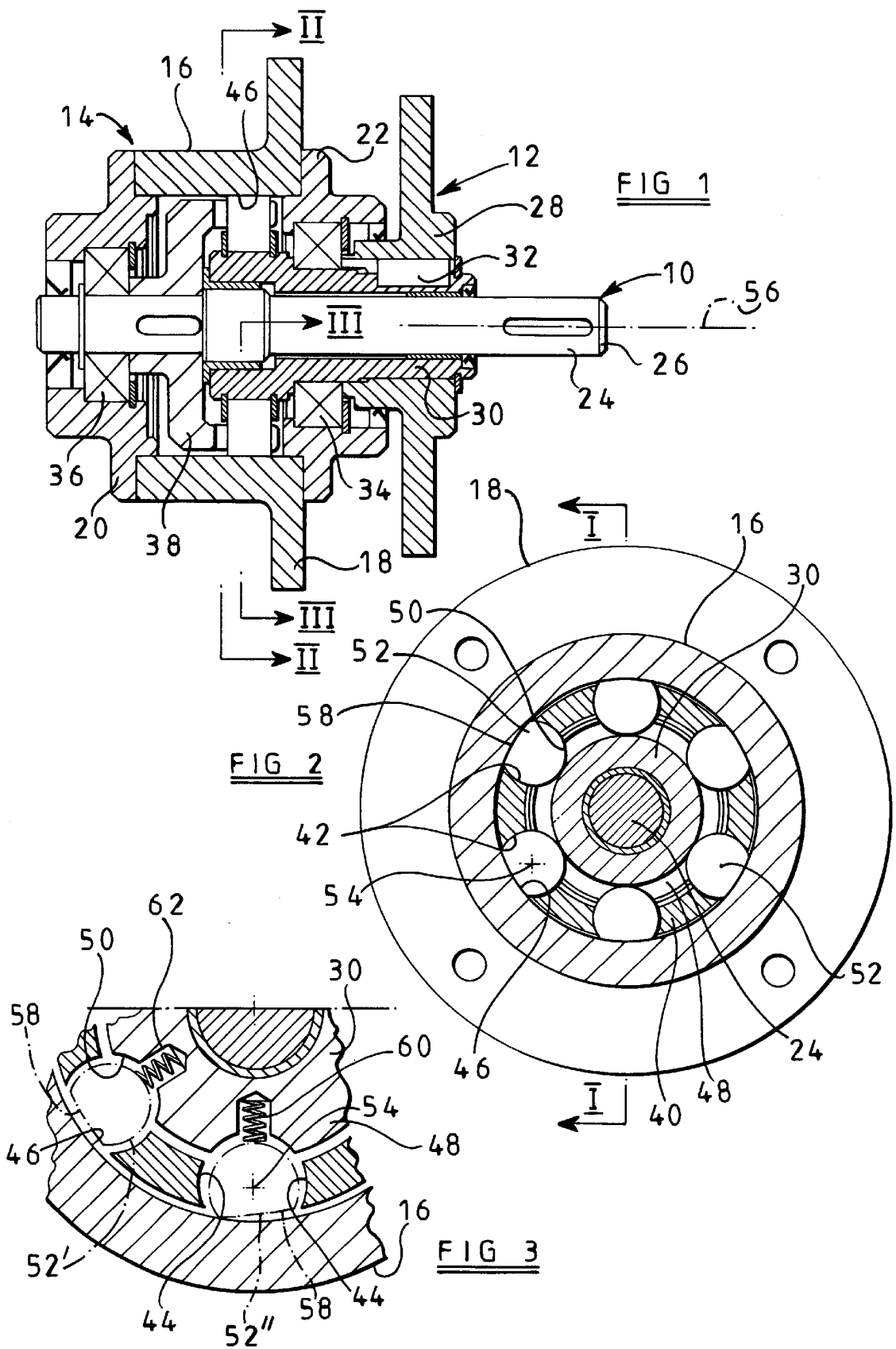

ROTARY COUPLINGS

INTRODUCTION

This invention relates to rotary couplings, for transmitting rotary motion from a driving part to a driven part, i.e. for transmitting a driving torque.

The purpose of the invention is to provide a simple rotary coupling for use in applications where a reverse torque must not be transmitted to the driving side. By a reverse torque we mean a torque applied externally to the driven part of the coupling. In this connection the actual direction of rotation, clockwise or anti-clockwise, is immaterial; the invention is concerned with rotary couplings which are not restricted as to the direction of rotation; rather, it provides a coupling in which torque is freely transmitted from the driving side to the driven side but not vice versa.

SUMMARY OF THE INVENTION

According to the invention, there is provided a rotary coupling comprising:

- a driving part and a driven part, for transmission of driving torque between them;
- a fixed part in which the driving and driven parts are each rotatable coaxially;
- and a set of planetary coupling members carried by one of the driving and driven parts and in torque-transmitting engagement with the other,
- the coupling members being juxtaposed to an annular braking surface of the fixed part, each coupling member being free to tilt with respect to the driving and driven parts, into and out of engagement with the braking surface,
- and the arrangement being such that a driving torque, applied by the driving part to the coupling members, is transmitted by the latter to the driven part without engagement of the coupling members with the braking surface; but a reverse torque, applied by the driven part to the coupling members, tends to tilt the latter into wedging engagement with the braking surface so as to lock up the coupling.

The coupling of the invention is simple and robust, and can be used in a very wide variety of applications, for example powered wheelchairs, winches, roller blinds, wheel-actuated rudders for boats and ships, and any land vehicle having a rotary transmission for driving torque between an input side and an output side, in which the coupling can for example conveniently be incorporated in the propeller shaft.

It is to be understood that the driving part could be rotated by a power drive or it could be rotated manually.

Most conveniently the coupling members are carried by the driving part.

According to a feature of the invention, with each coupling member defining a tilt axis parallel to the axis of the coupling, each coupling member is engaged by the driving part for transmission of the driving torque by a generally tangential thrust applied in a radial zone substantially closer to the tilt axis than the radial zone in which the coupling member engages the driven part.

Preferably with this arrangement, the driving part includes a planet carrier comprising a ring coaxial with the driven part, the ring having seats in which the coupling members are free to tilt in a radial plane, and which apply the driving torque. The coupling members project radially inward into the zone of their engagement with the driven part.

According to another feature of the invention, each coupling member is a roller, the major part of which is cylindrical with a cylinder axis parallel to the axis of the coupling, the cylinder being truncated parallel to its axis to define a wedging surface of the roller facing the adjacent braking surface of the fixed coupling part. Preferably then, each said wedging surface is arcuate in cross section and of slightly smaller radius than the braking surface.

In preferred embodiments, the driven member has a radial flange interrupted by seating for engagement by the coupling members.

A rotary coupling in one preferred form according to the invention will now be described, by way of non-limiting example only and with reference to the accompanying drawings.

BRIEF DESCRIPTION OF THE DRAWINGS

FIG. 1 is a simplified view of the coupling in cross-section taken on the line I—I in FIG. 2;

FIG. 2 is a view in cross section on the line II—II in FIG. 1; and

FIG. 3 is a scrap view in cross section on the line III—III in FIG. 1, with the coupling rollers shown diagrammatically.

DESCRIPTION OF THE PREFERRED EMBODIMENTS

The coupling shown in FIG. 1 consists essentially of a driving part 10 and a driven part 12, for continuous transmission, in normal operation, of a driving torque from the driving part to the driven part. The coupling also has a fixed part 14 in which the driving and driven parts 10 and 12 are each rotatable coaxially on a main axis 56 of the coupling.

The fixed part 14 in this example comprises an open-ended cylindrical body 16 having a fastening flange 18 by which the coupling is secured to the vehicle or other appliance, which will be taken to be a winch in this example. One end of the body 16 is closed by an end plate 20 and the other by an end plate 22. The body 16 and its two end plates are secured together by suitable fastening means, not shown, for example by bolts and nuts and/or studs.

The driven part 12 of the coupling comprises a face plate 28 which is suitably coupled to the winch drum (not shown). The driven part also includes an output sleeve 30, to which the face plate 28 is attached, for example by means of a key 32, the output sleeve 30 being mounted coaxially in a bearing 34 in the end plate 22 of the fixed part 14.

The driving part 10 of the coupling comprises a driving shaft, or input shaft, 24 having a projecting portion 26 which is coupled to the power drive, not shown, of the winch. The shaft 24 extends coaxially through the output sleeve 30, so as to be supported indirectly by the bearing 34 in the fixed part 14 and directly in a further bearing 36 in the end plate 20. The driving part 10 is completed by a planet carrier 38 keyed on the shaft 24.

The carrier 38 includes a coaxial, integral, annular ring 40 which is interrupted by a number of seats 42, each having two opposed thrust surfaces 44, each of which is generally in the form of an arc of a circle. As shown in FIG. 3, the outer perimeter of the ring 40 lies just radially inside the axial bore of the body 16, which constitutes a braking surface 46 as will be seen below. The ring 40 surrounds a radial flange 48 which is an integral part of the output sleeve 30. The flange 48 is formed with curved recesses 50 which are open towards the corresponding seat 42.

Thus, the driving part 10 and the driven part 12 of the coupling, coaxial with each other, are rotatable one within the other, and are both rotatable coaxially within the fixed part 14.

The driving and driven parts are coupled together by means of a set of coupling members 52. These are arranged in a planetary array around the output sleeve 30. In this example, each coupling member 52 is a roller, the major part of which is cylindrical with a cylinder axis 54 parallel to the axis 56 of the coupling itself. However, in each member 52, this cylinder is truncated parallel to its axis, as can clearly be seen in FIG. 2, to define a surface 58 facing radially outwards towards the braking surface 46. In this example each surface 58 is of arcuate cross section, with a slightly smaller radius than the braking surface 46 and as we shall see. It constitutes a wedging surface under certain conditions.

It will be noted that the cylinder axis 54 of each roller lies on a pitch circle which is intermediate between the inner and outer perimeters of the ring 40.

Thus, in normal operation when a torque is being transmitted from the driving part 10 to the driven part 12, this torque is transmitted to the rollers 52 by the ring 40, through the appropriate thrust surfaces 44 (depending on the direction of rotation), in the form of a generally tangential thrust in a radial zone (generally defined by the surface, 44), so that this thrust is close to or passes through, the axis 54 of each roller.

The rollers 52 project radially inwards from the ring 40 to engage, in another radial zone, in the seating recesses 50 of the output sleeve, thereby transmitting the torque to the driven part 12 of the coupling.

In this normal configuration, each roller lies in a generally radially symmetrical attitude in its seat 42 as indicated at 52' in phantom lines in FIG. 3. It should be noted that in FIG. 3, the clearances around the rollers are exaggerated for clarity. The wedging surfaces 58 are out of contact with the braking surface 46.

If on the other hand a net reverse torque is applied (for example by the load on the winch in a runaway condition) externally to the driven part 12 of the coupling, this reverse torque is transmitted to the coupling members 52 through the seating 50. The radial engagement zone of the coupling members 52 with the driven part is substantially further from the roller axis 54 than the radial zone in which the forward thrust is applied by the surfaces 44 in the normal driving mode. A tilting moment is therefore applied to the rollers 52, causing them to tilt as indicated diagrammatically at 52" in FIG. 3, about the axes 54, which are therefore tilt axes. This forces the wedging surfaces 58 against the braking surface 46, thus tending to lock up the coupling by passing the reverse torque directly to the fixed coupling part 14 and not to the input part 10.

To assist this braking action, the surface 46 may be suitably treated with a friction coating or liner.

In order to ensure that, once any reverse torque is removed, the coupling members 52 will revert to their normal symmetrical position 52, light coil springs 60, engaging the back of the rollers 52 to bias the latter towards the surface 46, are mounted in radial seating 62 in the output sleeve 30. These are omitted in FIG. 1 for clarity.

Numerous modifications can of course be made within the scope of the claimed invention. The coupling members may for example be of any suitable form capable of tilting in a wedging action on application of a reverse torque but avoiding this action when the torque is being applied from the driving side. There may be any suitable number of coupling members.

What is claimed is:

1. A rotary coupling comprising:
   a driving part and a driven part, for transmission of driving torque between them;
   a fixed part in which the driving and driven parts are each rotatable coaxially; and
   a set of planetary coupling members carried by one of the driving and driven parts and in torque-transmitting engagement with the other,
   the coupling members being juxtaposed to an annular braking surface of the fixed part, each of said coupling members being free to tilt in two opposing directions, with respect to the driving and driven parts, into and out of engagement with the braking surface,
   and the arrangement being such that a driving torque, applied by the driving part to the coupling members, is transmitted by the latter to the driven part without engagement of the coupling members with the braking surface, but a reverse torque, applied by the driven part to the coupling members, tends to tilt all of said coupling members into wedging engagement with the braking surface so as to lock up the coupling.

2. A coupling according to claim 1, wherein the coupling members are carried by the driving part.

3. A coupling according to claim 2, wherein each of said coupling members defines a tilt axis parallel to the axis of the coupling, and is engaged by the driving part for transmission of the driving torque by a generally tangential thrust applied in a radial zone substantially closer to the tilt axis than the radial zone in which the coupling members engage the driven part.

4. A coupling according to claim 3, wherein the driving part includes a planet carrier comprising a ring coaxial with the driven part, the ring having seating in which the coupling members are free to tilt in a radial plane and which apply the driving torque, and wherein the coupling members project towards the axis of the coupling into the zone of their engagement with the driven part.

5. A coupling according to claim 1, wherein each of said coupling members is a roller, the major part of which is cylindrical with a cylinder axis parallel to the axis of the coupling, the roller being truncated parallel to its axis to define a wedging surface of the roller facing the adjacent braking surface of the fixed coupling part.

6. A coupling according to claim 5, wherein each said wedging surface is arcuate in cross section and of smaller radius than the braking surface.

7. A coupling according to claim 1, wherein the driven member has a radial flange interrupted by seating for engagement by the coupling members.

8. A coupling according to claim 1, having a friction surface on said braking surface.

9. A rotary coupling comprising:
   a driving part and a driven part, for transmission of driving torque between them;
   a fixed part in which the driving and driven parts are each rotatable coaxially; and
   a set of planetary coupling members carried by one of the driving and driven parts and in torque-transmitting engagement with the other,
   the coupling members being juxtaposed to an annular braking surface of the fixed part, each of the coupling members being free to tilt, with respect to the driving and driven parts, into and out of engagement with the braking surface, each of the coupling members being a roller, the major part of which is cylindrical with a cylinder axis parallel to the rotational axis of the coupling, the roller being truncated parallel to its axis to define a wedging surface of the roller facing the adjacent braking surface of the fixed coupling part, the arrangement being such that a driving torque, applied by the driving part to the coupling members, is transmitted by the latter to the driven part without engagement of any of the coupling members with the braking surface, but a reverse torque, applied by the driven part to the coupling members, tends to tilt the latter into wedging engagement with the braking surface so as to lock up the coupling.

10. A coupling according to claim 9, wherein each said wedging surface is arcuate in cross section and of smaller radius than the braking surface.

* * * * *